UNITED STATES PATENT OFFICE.

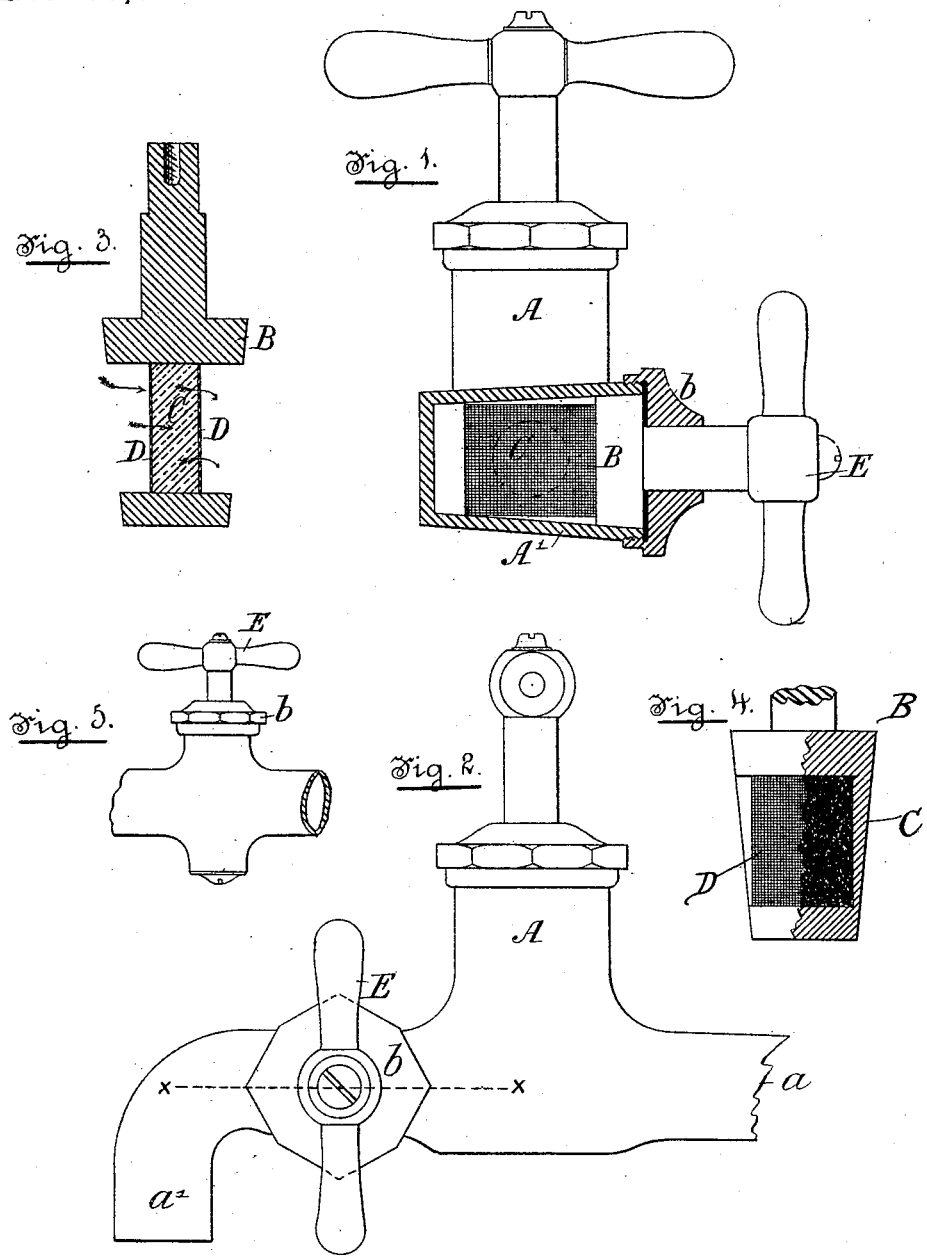

AUGUSTUS H. HORSNELL AND WILLIAM MURPHY, OF MONTREAL, QUEBEC, CANADA.

WATER-FILTERING DEVICE.

SPECIFICATION forming part of Letters Patent No. 266,693, dated October 31, 1882.

Application filed January 16, 1882. (No model.)

*To all whom it may concern:*

Be it known that we, AUGUSTUS HENRY HORSNELL and WILLIAM MURPHY, both of the city of Montreal, in the District of Montreal and Province of Quebec, in the Dominion of Canada, have jointly invented certain new and useful Improvements in Water-Filtering Devices; and we do hereby declare that the following is a full, clear, and exact description of the same.

Our invention has for its object to provide means whereby the water flowing from a tap or pipe may be thoroughly filtered through a permanent attachment, which will also permit of the full stream being drawn for washing purposes, &c., without its being filtered, when desired. The improvements are also so devised that the filtering medium can be reversed at will, perfect cleanliness being thus assured.

Our invention consists in placing in a water pipe or tap a transverse conical chamber and a revolving plug having coned bearing-heads, and two wire-gauze disks inclosing a filtering medium, the parts being so arranged that the filtering-chamber may have either its side or its edge presented to the inflowing water.

For a thorough comprehension of our invention reference must be had to the accompanying drawings, in which letters similar to those used in the following description serve to indicate like parts, and where—

Figure 1 is a sectional front elevation of a tap with our invention applied. Fig. 2 is a side elevation of same; Figs. 3 and 4, detail sectional views of spigot and filtering medium. Fig. 5 is a view showing our invention applied directly to a water-pipe.

A represents an ordinary water tap or faucet, $a$ being the inlet, and $a'$ the outlet. Near the mouth or front end, however, is formed an enlargement of somewhat the shape shown at A'. This enlargement is bored to a conical section corresponding to that of a spigot, B, which we insert and secure in place by a nut and washer, $b$, as shown in Fig. 1, or in any desired manner. This spigot B is cast preferably in the form of a double T, as shown in Figs. 3 and 4, the filtering medium, which we form preferably of a solid piece of carbon or charcoal, being placed centrally between the ends, as shown at $c$, an opening being left therefor through the substance of the spigot. This filtering medium is preserved in place by screens of fine wire-cloth D D, placed one on each side of the same and soldered to the substance of the spigot B. When the tap or faucet A is open and the spigot B turned in the position shown in the drawings the water can flow freely from the pipe and pass through the filtering medium C, which will entirely cleanse the stream from all foreign matters and allow it to be drawn pure from the outlet $a$.

In some instances it will be desirable to dispense with the filter, such as when the water is to be used for washing and other like purposes. In such cases it is only necessary to turn the spigot-lever (represented by E) in either direction for one-quarter of the circle, or into the position shown by the dotted lines $x$ $x$ in Fig. 2, to allow the water to flow freely through the spaces between the wire screens D D and the outer face of the spigot B, and then to reverse the action of the filter or cause the water to pass through the opposite side of the filtering medium, for the purpose of cleansing same, a turn for another quarter of the circle in the same direction is all that is required.

Although here shown as placed in front of the ordinary faucet, A, or between it and the outlet, it must be understood that we may place the spigot B and its filter behind the same or in any position along the water-pipe, a modification suitable for the latter arrangement being shown in Fig. 5.

We are aware that the patent of Jennison, of 1849, shows a spherical or globular chamber in a water-pipe, such chamber having a cap containing filtering material and adapted to be turned by a handle to present either its face or its edge to the inflowing water, and we disclaim the same, our invention being limited to details of construction, the improvements in which render a much tighter and more secure joint in the chamber, and add greatly to the utility and convenience of the device.

What we claim, and desire to secure by Letters Patent, is as follows:

Combined with a water pipe or tap, A, a transverse tapering or conical chamber, A', a revolving plug, B, having correspondingly coned or tapered bearings, and the wire-gauze disks D, inclosing a filtering medium secured between said conical heads.

A. H. HORSNELL.
      WM. MURPHY.

Witnesses:
 R. A. KELLOND,
 F. C. MOREY.